United States Patent [19]

Astle

[11] 4,365,528

[45] Dec. 28, 1982

[54] PORTABLE LATHE

[76] Inventor: William H. Astle, 2380 LaLoma Dr., Rancho Cordova, Calif. 95670

[21] Appl. No.: 205,988

[22] Filed: Nov. 12, 1980

[51] Int. Cl.³ .............................................. B23B 5/16
[52] U.S. Cl. ...................................... 82/4 C; 144/205
[58] Field of Search .................... 82/4 R, 4 C, 28 R; 144/205 R

[56] References Cited

U.S. PATENT DOCUMENTS

| | | | |
|---|---|---|---|
| 2,053,644 | 9/1936 | Tuttle | 82/4 R |
| 3,131,599 | 5/1964 | MacFarlane et al. | 82/4 R |
| 3,141,364 | 7/1964 | Kelley et al. | 82/4 R |
| 3,229,555 | 1/1966 | Castles | 82/4 R |
| 3,361,017 | 1/1968 | Baumgarten | 82/4 R |
| 3,526,158 | 9/1970 | Adams | 408/9 |
| 3,537,341 | 11/1970 | Zahuranec et al. | 82/4 R |
| 3,817,649 | 6/1974 | Medney | 144/205 |
| 3,875,381 | 4/1975 | Beauloye | 82/4 C |
| 3,927,584 | 12/1975 | Mayfield | 82/4 C |
| 3,999,452 | 12/1976 | Larsen | 144/205 |
| 4,149,436 | 4/1979 | Blatter | 82/4 C |
| 4,319,503 | 3/1982 | Saine et al. | 82/4 C |

Primary Examiner—Leonidas Vlachos
Assistant Examiner—Jerry Kearns
Attorney, Agent, or Firm—Bacon & Thomas

[57] ABSTRACT

A portable lathe (10) for machining precise conical surfaces on a fixed workpiece (42) using rotating inclined cutter bits (38) driven by air motors (16, 18) through drive shafts (64, 66), worm gears (68, 70), a ring gear (60) and a carrier shaft (52) that is axially movable towards and away from the workpiece under control of a feed control handwheel (78). Exhaust air with entrained lubricant from the drive motors cools and lubricates the interior of the lathe and blows chips out of the housing (12) through observation openings (86). Axial projections (48) are keyed to a workpiece (43) during a machining operation to prevent relative rotation between the workpiece, which is accurately located relative to the cutter bits by a conical guide (47) in the open end of the housing.

1 Claim, 3 Drawing Figures

PORTABLE LATHE

BACKGROUND OF THE INVENTION

This invention relates to portable lathes. More specifically, the invention is in a portable lathe for machining conical surfaces accurately on the end area of a fixed metal workpiece.

Portable lathes generally are well known tool devices for machining large objects in place or while they are still assembled to their adjacent support structure. Representative illustrations of portable lathes are seen in U.S. Pat. Nos. 3,938,411 and 3,982,451, which show their classification as Class 82, subclass 4 of the U.S. Patent Classification system.

The present invention comprises an arrangement of portable lathe elements that enables precise machining of a conical surface on the end area of a fixed, generally tapered workpiece in a precise, efficient manner.

SUMMARY OF THE INVENTION

This invention is a portable lathe useful to machine a precise conical surface on the end area of a fixed workpiece. A set of cutter bits arranged to machine a conical surface are rotated by a dual fluid motor drive arrangement through a set of worm and ring gears while they are fed over the end of the workpiece under the control of a feed control mechanism.

The workiece is engaged by a locator guide secured to the end of the lathe that locates and guides the tool over the workpiece while it prevents relative rotation between the tool and the workpiece.

The workpiece for which this invention is particularly adapted is a base or pad element for supporting replaceable teeth or earth working equipment, e.g., dredging machinery. The tool support is secured to the machinery and has a generally square base from which extends a conical projection having an end area that interlocks with conical socket in the tooth which is cantilevered from the pad. The conical end surface area is subjected to wear and tear during equipment operations and resurfacing the end area has presented a problem not easily met by prior art devices.

In use, the tool is located over the workpiece by placing it into position and the cutter bits are driven by the motors while they are advanced into cutting engagement with the workpiece surface adjacent its free end area. A conical machined surface is generated simply by axially moving the cutter bits in a direction towards the workpiece receiving end of the portable lathe.

The tool has a provision for blowing chips away from the tool interior while lubricating and cooling the tool drive mechanism, preferably involving the use of exhausted compressed air from the drive motors that has been carried to a conduit extending through the tool interior.

The foregoing characteristics and advantages of the invention will be more evident upon a consideration of the following detailed description of a preferred embodiment.

BRIEF DESCRIPTION OF THE DRAWINGS

With reference to the appended drawings, showing a preferred embodiment.

DETAILED DESCRIPTION OF THE INVENTION

Figure 1:
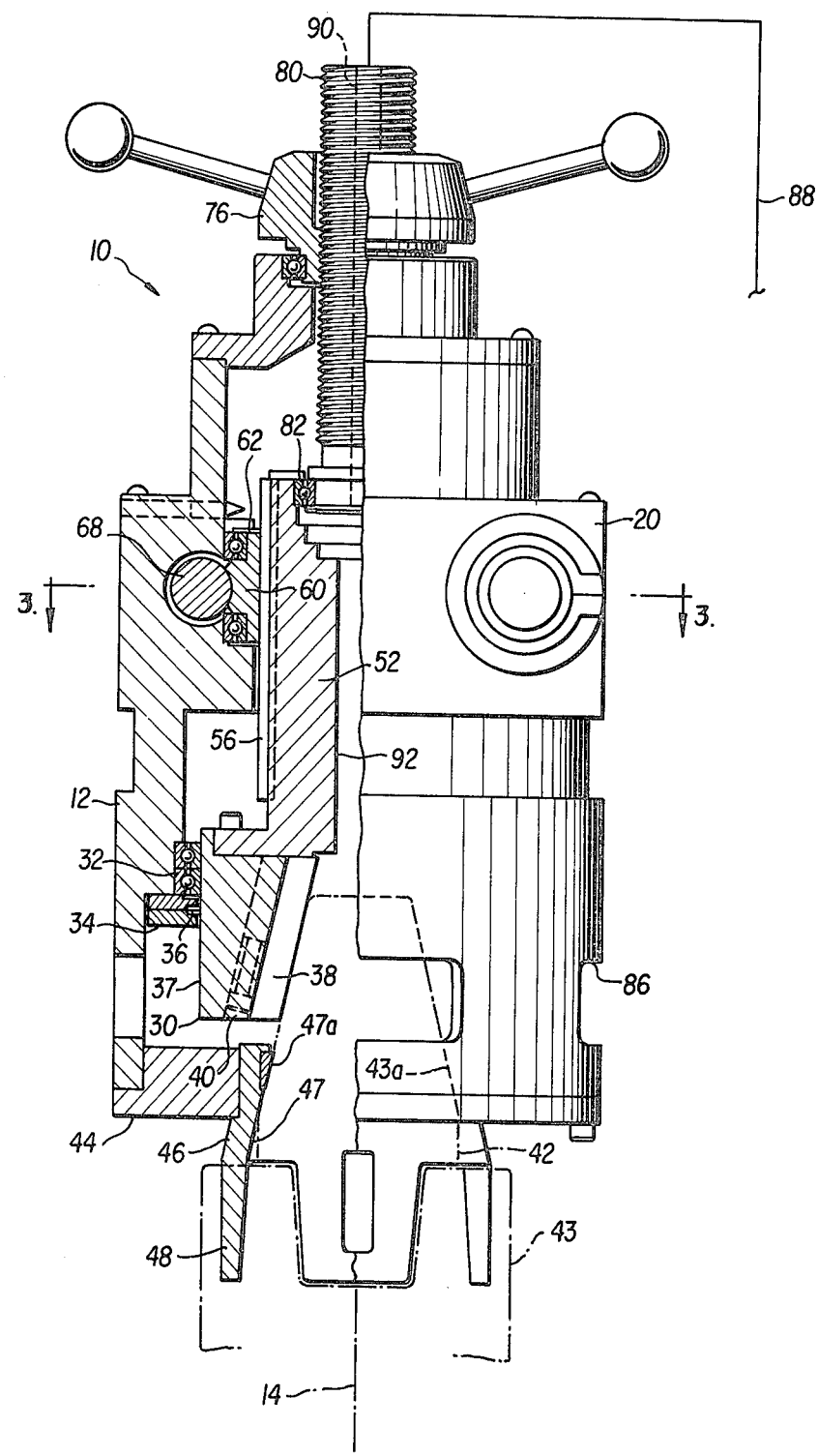
FIG. 1 is a side elevational, partial longitudinal sectional view of the portable lathe embodying the present invention.
Figure 2:
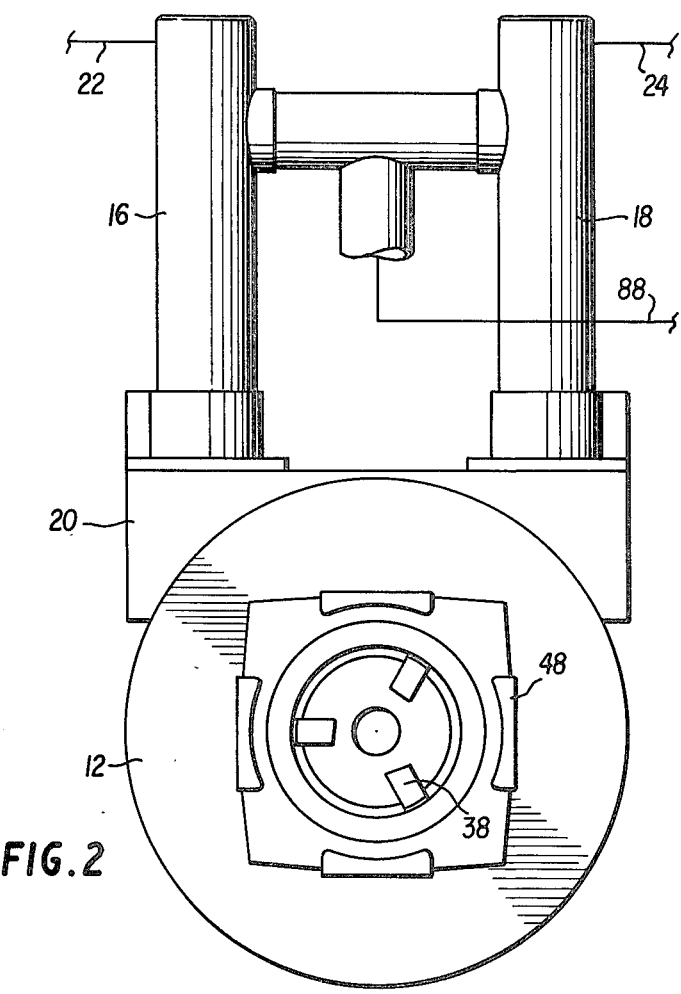
FIG. 2 is a bottom view of the device as shown in FIG. 1.
Figure 3:
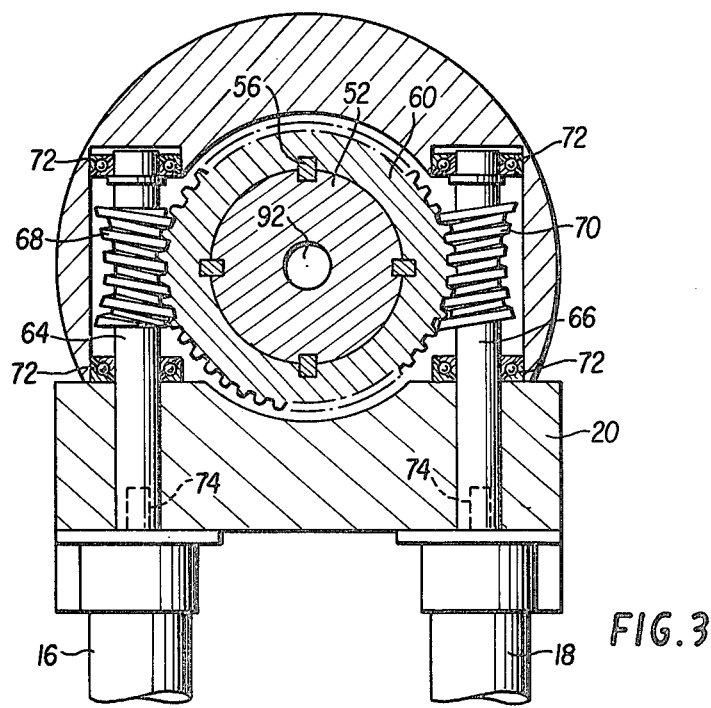
FIG. 3 is a cross-sectional view taken along lines III-3 in FIG. 1.

With reference to FIG. 1, a preferred embodiment of a portable lathe tool 10 constructed in accordance with this invention is shown. The portable lathe tool 10 comprises an outer, generally cylindrical housing 12 that is essentially symmetrical about longitudinal axis 14. As best seen in FIGS. 2 and 3, a pair of fluid motors 16, 18 are connected to the housing 12 by means of a motor support cap 20 that is removably secured by suitable fasteners (not shown) to the housing 12. Fluid lines 22, 24 to the motors 16, 18, respectively, preferably supply compressed air to the motors to actuate the portable lathe 10.

Centrally supported within the working end of the tool 10 (the lower end as viewed in FIG. 1) is a tool bit support hereinafter referred to as a cutter head 30. The cutter head 30 is precisely mounted within the bearings 32 that are retained by a wiper ring support 34 within which is mounted a wiper ring 36 which keeps the contamination out of the bearings 32. The radially outer side of cutter head 30 is a smooth cylindrical guide surface 37 that is precisely located by the inner races of the bearings 32 to permit rotary and axial movement of the cutter head 30 within the housing 12. It will be observed that the bearing 32 prevents radial movement of the cutter head 30 while permitting rotary and axial movement of the latter.

Cutter bits 38 (preferably 3 in number) are circumferentially spaced about the inner surface of the annular cutter head 30. The cutter bits 38 are retained in the cutter head by generally axially extending lock fasteners 40 that securely locate and lock the cutter bits 38 within their support areas on the cutter head 30. The cutter bit 38, when rotated about axis 14, their axis of rotation, generate a conical surface, since they are included with respect to and diverge away from the axis 14 towards the lower end of the tool. The lower end of the tool engages and receives a workpiece 42 shown in phantom that is to be machined by the cutter bits 38.

The workiece 42 includes a base portion 43 and an end surface area 43a that is tapered; that is, the end surface area is a conical shaped section having an axis of symmetry extending along the center line of the workpiece. The workpiece receiving and engaging end of the portable lathe tool 10 is partially closed by a base plate 44 secured in a suitable manner by removable fasteners to the end of housing 12. An annular workpiece locator guide 46 is secured rigidly to the base plate 44 and includes axial work engaging projections 48 that engage counterpart sockets or other correspondingly shaped receiving openings in the workpiece base area 43. The locator guide 46 also includes a locator guide surface 47 that engages part of the tapered or conical end area of the workpiece 42. Optionally, a set of locator guide pads 47a may be provided within the guide surface area of the locator guide 46.

The portable lathe according to the present invention has been especially designed to precisely machine conical surfaces on the end area of a tapered workpiece that has been cast or welded into the general configuration shown in FIG. 1. In actual practice, the workpieces 42 are conical mounting pads for the cutting teeth of earth working equipment. During overhaul or maintenance operations carried out from time to time on such equipment, it is necessary to replace the cutting teeth on the earth moving part of the equipment. When the cutting teeth are replaced, the mounting pads often must be resurfaced in accordance with a procedure that usually involves welding surface metal onto the end area of the worn or deformed pad and then machining an accurate conical surface on the end area of the pad so that a precise fit is obtained between the pad and the new tooth, which actually is a crown element that fits over the pad in interlocking relationship.

The portable lathe of this invention is used to machine the conical surface on the end of the pad. This is carried out by placing the portable lathe over the tooth pad, here shown as workpiece 42, while the pad is still secured to the earth moving equipment. The tool guide surface 47 engages the conical portion of the pad, while the projections 48 engage similarly shaped receiving openings in the workpiece, whereby the tool and workpiece are accurately located with respect to each other with the center line of the pad extending along longitudinal axis 14 of the lathe. The projections 48 prevent relative rotation between the housing 12 and the workpiece, while the conical configuration of the locator guide surface 47 locates the workpiece in an axial sense relative to the tool housing 12.

The cutter bits 38 are axially located away from the end surface area of the workpiece 42 until it is desired to carry out the resurfacing operation, at which time the cutter head 30 is driven in rotation and axially advanced to bring the cutter bits into engagement with the end surface area of the workpiece 42.

The cutter head 30 is driven in rotation and is axially fed towards and away from the workpiece 42 by a carrier shaft 52. Longitudinal keys 56 are disposed in longitudinally extending keyways provided on the surface of carrier shaft 52 are splined with the inner surface of a ring gear 60 in a torque transmitting relationship that permits the carrier shaft 52 to axially slide through the ring gear 60. The bearings 62 locate and support ring gear 60 which locates the driving end of the carrier shaft 52 relative to the housing 12.

A pair of drive shafts 64, 66 (see FIG. 3) extending laterally and tangentially with respect to the ring gear 60 are connected to the ring gear by worm gears 68, 70 that are keyed and locked to the drive shafts 64,66. The drive shafts 64,66 are journalled by thrust roller bearings of the equivalent 72 that locate the drive shaft and react the thrust/radial loads imposed thereon to the housing 12. The drive shafts 64,66 extend laterally out of the housing 12, as shown in FIG. 3, at a portion of the housing 12 that is cut away.

A cap 20 fits over the cutaway portion of the housing 12 and locates a set of dual drive motors 16, 18 in a manner such that the drive motor output shafts are coupled to the drive shafts 64, 66 in driving relationship, for example, by a coupling schematically illustrated at 74, in FIG. 3. It is preferred to utilize two drive motors in order to maintain an overall compact design of the portable lathe, to distribute drive loadings to the housing and the ring gear, and to permit smaller motors to be utilized. A single motor, though possessing fewer advantages, could nevertheless be used at one side of the ring gear to drive the carrier shaft.

The carrier shaft 52 is axially moved to feed the cutter bits 38 to or from the workpiece end area 42. Axially movement of the carrier shaft 52 is obtained by rotating a feed nut 76 by means of a feed control handwheel 78 to cause movement of a threaded feed control rod 80 axially along axis 14. The feed control rod 80 is connected by a bearing 82 to the carrier shaft 52 so that rotation of the latter is not imparted to the feed control rod, which is non-rotatable.

Several observation openings 86 are provided in the housing 12 to permit the tool operator to visually observe the machining progress within the cutter bit area. These openings also permit egress of metal chips generated during the machining operation on the workpiece 42.

Exhaust air from motors 16, 18 is carried by line 88 to the end of feed control rod 80 which has a bore 90 extending therethrough which is in communication with a similar bore 92 in the carrier shaft 52. The bores 90 and 92 form an air conduit to distribute exhaust air from the motors 16, 18 to the interior of the housing 12, and in particular to the area of the cutter head 30.

The exhaust air from the motors 16, 18 normally has oil entrained therein so that the air admitted to the interior of the housing 12 cools and lubricates the moving elements while at the same time serving to blow chips generated during the machining operation out of the observation openings 86. Of course, suitable other openings or conduits could be provided optionally in housing 12 to direct motor exhaust air to the shaft, gears, and bearing elements comprising the lathe.

In operation, the portable lathe disclosed is placed upon a workpiece 42 with the lathe usually oriented near a vertical orientation, although this is not critical for its operation. Motors 16, 18 are supplied with compressed air under the control of the lathe operator by means of a suitable control switch or valve (not shown) to cause rotation of the cutter head. The cutter head is then advanced toward the workpiece to generate a conical surface about its center line, which nominally coincides with the longitudinal axis 14 of tool 10. When the proper cut has been made, the tool is simply lifted away from the workpiece and the cutter head 30 is retracted in preparation for the next operation.

Various modifications to the illustrated embodiment can be made within the normal range of alternatives available to those skilled in the art without departing from the inventive concept herein disclosed and claimed below.

I claim:

1. A portable lathe comprising:
   (a) a housing extending along a longitudinal axis and having an open end area for receiving a workpiece to be machined at one end of said housing;
   (b) an annular cutter head and carrier shaft assembly disposed within the housing and arranged to be rotated about and translated along said rotational axis, the cutter head part of said assembly including a radially outer surface defining a cylindrical bearing guide surface and an inner annular area;
   (c) one or more cutter bits mounted on the inner annular area of the cutter head part of said assembly, the cutter bit or bits being inclined relative to the longitudinal axis to cut a conical taper on a workpiece inserted into said open end of the housing and presented to the cutter head part, the taper converging towards the interior of the housing;

(d) an annular, rotatable ring gear drivingly connected to the exterior of the carrier shaft part of said cutter head and carrier shaft assembly, said carrier shaft part slidable longitudinally within said ring gear, said ring gear fixed against longitudinal motion along said longitudinal axis;

(e) dual drive shafts extending through the housing and drivingly connected to said ring gear on opposed sides of said ring gear;

(f) rolling bearing means within the housing and in engagement with said bearing guide surface of said cutter head part for supporting and locating said cutter head part while the latter is rotating and translating about and along said longitudinal axis;

(g) feed means for causing said cutter head and carrier shaft assembly to translate along said longitudinal axis towards or away from said open end of said housing, said feed means including a threaded nut secured to the housing for rotational movement and a threaded feed rod axially movable within said feed nut and threadedly engaged therewith, said feed rod connected to said carrier shaft part of said cutter head and carrier shaft assembly through a joint connection permitting relative rotation between the feed rod and said carrier shaft part, whereby rotation of the feed nut causes the cutter head and carrier shaft assembly, and the feed rod, to translate along said longitudinal axis while said assembly is rotating, while said ring gear is rotating but not translating, and while said feed rod is translating but not rotating;

(h) a workpiece annular guide located at said open end of said housing, said guide having a conical interior opening symmetrical about and concentric with said longitudinal axis, said conical opening of said guide converging towards said cutter head and carrier assembly; and (i) a plurality of projections extending axially in front of the housing opening about said conical interior opening of said guide and concentric with said opening for engaging cooperating openings in a workpiece presented in said open end of said housing for preventing relative rotation between such workpiece and the housing.

* * * * *